United States Patent
Arthurs

(10) Patent No.: US 7,875,562 B2
(45) Date of Patent: Jan. 25, 2011

(54) POLYETHYLENE FABRIC WITH IMPROVED PHYSICAL PROPERTIES AND METHOD FOR MAKING THEREOF

(75) Inventor: Trevor Arthurs, Truro (CA)

(73) Assignee: Intertape Polymer Corp., Bradenton, FL (US)

( * ) Notice: Subject to any disclaimer, the term of this patent is extended or adjusted under 35 U.S.C. 154(b) by 379 days.

(21) Appl. No.: 11/442,014

(22) Filed: May 26, 2006

(65) Prior Publication Data
US 2006/0276091 A1 Dec. 7, 2006

Related U.S. Application Data

(60) Provisional application No. 60/686,485, filed on Jun. 1, 2005.

(51) Int. Cl.
D04H 1/00 (2006.01)
D03D 9/00 (2006.01)
D03D 15/08 (2006.01)
D03D 15/00 (2006.01)

(52) U.S. Cl. .............. 442/2; 442/1; 442/182; 442/185; 442/186

(58) Field of Classification Search ........ 442/1, 442/2, 182, 185, 186; 428/35.7
See application file for complete search history.

(56) References Cited

U.S. PATENT DOCUMENTS

| | | | |
|---|---|---|---|
| 3,996,968 A | 12/1976 | Bergman et al. | |
| 4,086,774 A | 5/1978 | Duggins | |
| 4,199,106 A | 4/1980 | Kojimoto et al. | |
| 4,210,287 A | 7/1980 | Mehoudar | |
| 4,368,233 A | 1/1983 | Barkis et al. | |
| 4,430,020 A | 2/1984 | Robbins | |
| 4,650,830 A | 3/1987 | Yonekura et al. | |
| 4,702,787 A | 10/1987 | Ruskin et al. | |
| 5,332,160 A | 7/1994 | Ruskin | |
| 5,543,373 A | 8/1996 | Winter et al. | |
| 6,367,513 B1 * | 4/2002 | Cain | 139/383 R |
| 6,403,013 B1 | 6/2002 | Man | |
| 6,540,158 B1 | 4/2003 | Vered | |
| 6,586,073 B2 * | 7/2003 | Perez et al. | 428/141 |
| 6,615,875 B2 | 9/2003 | Adolphs et al. | |

(Continued)

OTHER PUBLICATIONS

McNally, Donald article titled "Ethylene-Norbornene Copolymers" published online Oct. 22, 2001 Encyclopedia of Polymer Science and Technology.*

(Continued)

Primary Examiner—Rena L Dye
Assistant Examiner—Jennifer Steele
(74) Attorney, Agent, or Firm—The Marbury Law Group, PLLC

(57) ABSTRACT

An improved polyethylene fabric comprises polyethylene fabric or yarn that is manufactured by mixing HDPE (typically in pellet form) with pellets of cyclic-olefin polymers (COCs) in a ratio of up to 40% by weight of the layer. This mixture is then extruded in ways known to those skilled in the art. The resulting HDPE has superior stress and strain characteristics over a wider range of pressures and temperatures than conventional HDPE. The improved polyethylene fabric of the present invention is useful in applications where structural integrity is required and where pressure and temperature are a factor. For example, improved HDPE scrims of the present invention can be used as the reinforcing structure for irrigation hose or building fabric.

19 Claims, 5 Drawing Sheets

U.S. PATENT DOCUMENTS

| | | | |
|---|---|---|---|
| 6,675,838 | B2 | 1/2004 | Arthurs et al. |
| 6,809,153 | B2 | 10/2004 | Jeong et al. |
| 2004/0222321 | A1 | 11/2004 | Golan et al. |
| 2005/0095419 | A1 | 5/2005 | Raeburn et al. |
| 2006/0046006 | A1* | 3/2006 | Bastion et al. ............. 428/35.2 |

OTHER PUBLICATIONS

High Density Polyethylene published online in polymernetbase.com Polymer Property Database.*

McNallly, Donald article titled "Ethylene-Norbornene Copolymers" published online Oct. 22, 2001 Encyclopedia of Polymer Science and Technology.*

PCT Notification Concerning Transmittal of International Preliminary Report on Patentability (Chapter 1 of the Patent Cooperation Treaty), Application No. PCT/US2006/020772, "*Polyethylene Fabric with Improved Physical Properties and Method for Making Thereof*" mailed Dec. 21, 2007, nine pages.

"Topas, Thermoplastic Olefin Polymer of Amorphous Structure (COC)," Ticona Product Description, Sep. 2004.

"Topas COC—A clearly extraordinary polymer," Product Description, May 11, 2006.

SCLAIR polyethylene, HDPE Blow Molding Resin, NOVA Chemicals, Product Data Sheet, Aug. 17, 2004.

Wang, Diana, et al., "Understanding the relative properties of polymer systems," MIT, Cambridge, MA, 3.039 Symposium, 2005.

* cited by examiner

Table 1

| Elongation of an individual tape at a Stress Level of 80 Mpa | | | | |
|---|---|---|---|---|
| Tape Sample ID | Elongation at 30C | Elongation at 40C | Elongation at 60C | Elongation at 80C |
| 1600 denier HDPE tape | 7.9 | 9.2 | 10.1 | could not reach 80 Mpa |
| 1600 denier HDPE tape with 10% COC | 6.8 | 7.3 | 8.4 | could not reach 80 Mpa |
| 1600 denier HDPE tape with 20% COC | 6.1 | 6.7 | 6.3 | could not reach 80 Mpa |

Fig. 5

POLYETHYLENE FABRIC WITH IMPROVED PHYSICAL PROPERTIES AND METHOD FOR MAKING THEREOF

This application claims the benefit under 35 U.S.C. §119 (e) from provisional application No. 60/686,485 filed Jun. 1, 2005. The 60/686,485 provisional application is incorporated by reference herein, in its entirety, for all purposes.

BACKGROUND

The present invention relates to polyethylene fabrics with improved physical properties. In particular, the present invention relates to improved polyethylene fabric for use in applications where a consistent amount of stretch under a fixed load with varying temperatures is important. Specific examples include tensioned fabric buildings and lay flat irrigation hose.

Polyethylene fabrics have many advantages. Such fabrics are lightweight, non-toxic and can be recycled for other uses. They can exist and be used in both woven and non-woven form. Further, polyethylene fabric can be woven into sheets and used in a variety of applications to make hoses for a variety of applications such as irrigation, and general water delivery in such industries as mining, agriculture, construction, fluming and greenhouse uses. In products used for these applications, polyethylene comprises and important part of the end product.

A disadvantage of conventional high density polyethylene fabric (HDPE) is that stretching occurs when HDPE is placed under stress. This stretching increases as temperature increases. Thus in high temperature, high stress environments, HDPE fabrics may not exhibit the dimensional integrity needed for that application.

However, polyethylene products in general and high density polyethylene products (HDPE) in particular, when used to provide reinforcing scrims, have a lower capacity to hold stress without stretching as the temperature is increased. In irrigation applications, the tube or hose may burst under pressure at higher temperatures. In one example, a tube or hose of about 3 inches in diameter can hold 400 kPa at room temperature with only a small amount of stretch. However, when the temperature is increased to 60 C (degrees Centigrade), the tube stretches significantly thereby endangering its structural integrity. This stretching of the reinforcing scrim allows any coating to stretch to the point that water flows through the material of the tube where/when it is not intended.

What would therefore be useful is an improved polyethylene fabric that resists stretching when under pressure and which maintains its structural integrity as temperature increases.

SUMMARY OF THE INVENTION

The present invention is an improved polyethylene fabric for use in applications where structural integrity is required and where pressure and temperature are a factor. The improved polyethylene fabric of the present invention comprises polyethylene fabric or yarn that is manufactured by mixing HDPE (typically in pellet form) with pellets of cyclic-olefin polymers (COCs) in a ratio of up to 40% by weight of the layer. This mixture is then extruded in ways known to those skilled in the art. The resulting HDPE has superior stress and strain characteristics over a wider range of pressures and temperatures than conventional HDPE.

Improved HDPE scrims of the present invention can be used as the reinforcing structure for irrigation hose or building fabric. The woven fabric may also be coated with polyethylene, such as EMA, LDPE, LLDPE, etc, on one or both sides of the scrim for various desired effects such as protecting the contents of a building from contamination or the elements or holding water in the case of an irrigation tube. In irrigation applications, the fabric of the present invention is coated on one or both sides in order to prevent water leakage and to allow the fabric to be heat sealed to make larger panels or tubed shapes. The hose or fabric of the present invention is adapted to withstand significant amounts of pressure at various temperatures. For example, building fabrics may be subjected to pressure during construction, high wind conditions, stacking items next to the fabric wall and the like. The temperatures in which the fabric of the present invention is used vary during the seasons and depending on internal use of buildings made with such fabric. Hose applications are subjected to various water pressure applications. The seasonal and ground temperatures also vary widely in such applications depending on the season, i.e., summer or winter, and depending on the application. Thus, the improved HDPE fabric of the present invention will find use in bag applications, construction projects of all types, tensioned building applications, irrigation and water applications, covers for natural and man-made materials, land cover and a wide variety of other uses. Thus, reference to specific applications herein is not meant as a limitation but is for illustrative purposes only.

LIST OF FIGURES

FIG. 5 illustrates the strain levels of the different tapes measured on the curves shown in FIGS. 1-4.

DETAILED DESCRIPTION

Embodiments of the present invention provide for an improved HDPE fabric which may be woven to form a scrim having enhanced characteristics and ability to resist stretching under higher pressures and temperatures. For fabrics of the present invention, it was determined that the addition of certain polymers having a glass transition temperature higher than HDPE or other polyethylene polymers and also being compatible with the polyethylene copolymer improves the stretch and strain properties of products made with such polyethylene woven fabric. For example, adding cyclic-olefin polymers (COCs) to HDPE and making extruded film for fabric applications significantly improves the stretch and strain properties of the resulting hose or fabric under pressure and increased temperatures. The amount of added higher glass transition temperature polymer will vary depending on the desired properties and the particular application. In irrigation hose applications, adding from one to twenty percent COCs by weight of the layer to the HDPE results in significantly improved stress and strain properties. COCs are added together with the HDPE while in pellet form and physically mixed prior to extrusion. As used herein, "cyclic-olefin copolymers" (COCs) refer to copolymers built up from cyclic-olefins and comonomers, where the comonomer content has an upper limit of about 20% by weight, based on the weight of the cyclic-olefin polymer (preferably 1-15% by weight, and most preferably 1-8% by weight). Cyclic-olefins are mono- or polyunsaturated polycyclic ring systems, such as cycloalkenes, bicycloalkenes, tricycloalkenes or tetracycloalkenes. The ring systems can be monosubstituted or polysubstituted. Particularly preferred cyclic-olefins are polynorbornene, polydimethyloctahydro-naphthalene, polycyclopentene and poly(5 methyl)-norbornene. Particularly preferred for the invention are non-polar fully amorphous COCs, for example, those formed by polymerizing 2 norbornene with ethylene in presence of a single site catalyst (e.g. metallocene catalyst). COCs of the type useful for the present invention are available from Ticona, LLC (www.ticona.com) as TOPAS® cyclic olefin copolymer (COC) 9506 F-04 whose characteristics are incorporated herein by reference in their entirety. This specific COC is not however meant as a limitation and is but one example of a satisfactory COC.

Selection of a suitable COC resin will depend upon the producer of the COC as well the film manufacturing process employed. In general, film grade COCs produced using single site catalysts are usable. Particularly preferred are such COCs having a glass transition temperature (Tg) from 60° C. to 70° C.

Surprisingly, it has been found that adding COCs increases the suitability of the film for making scrim or woven fabric for high pressure and varying temperature (above room temperature) applications. The COCs improve the stress properties under increased pressures and varying temperatures.

Figure 1:
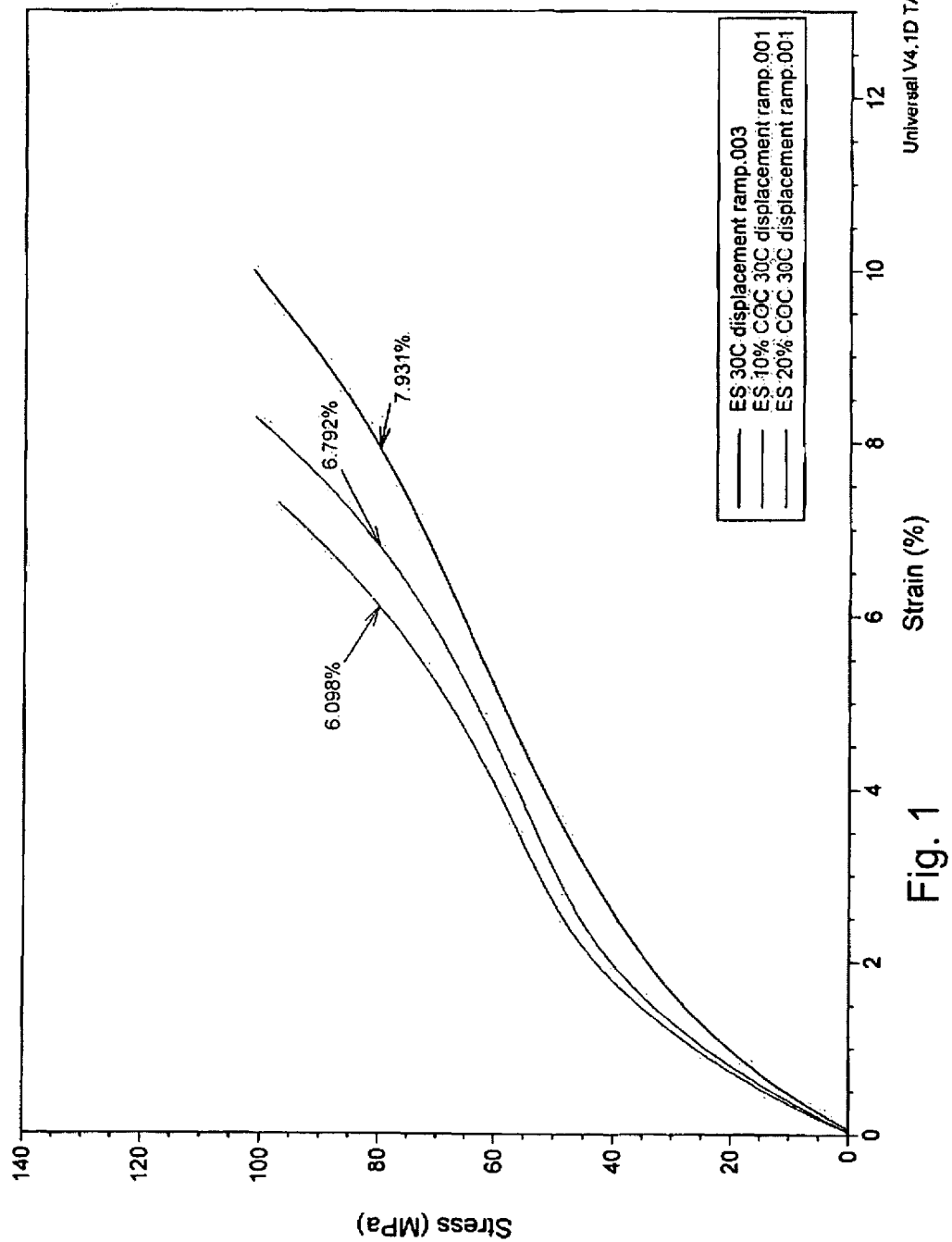
FIG. 1 illustrates DMA analysis at 30 degrees C. Stress vs Strain for standard HDPE and improved HDPE of the present invention.
Figure 2:
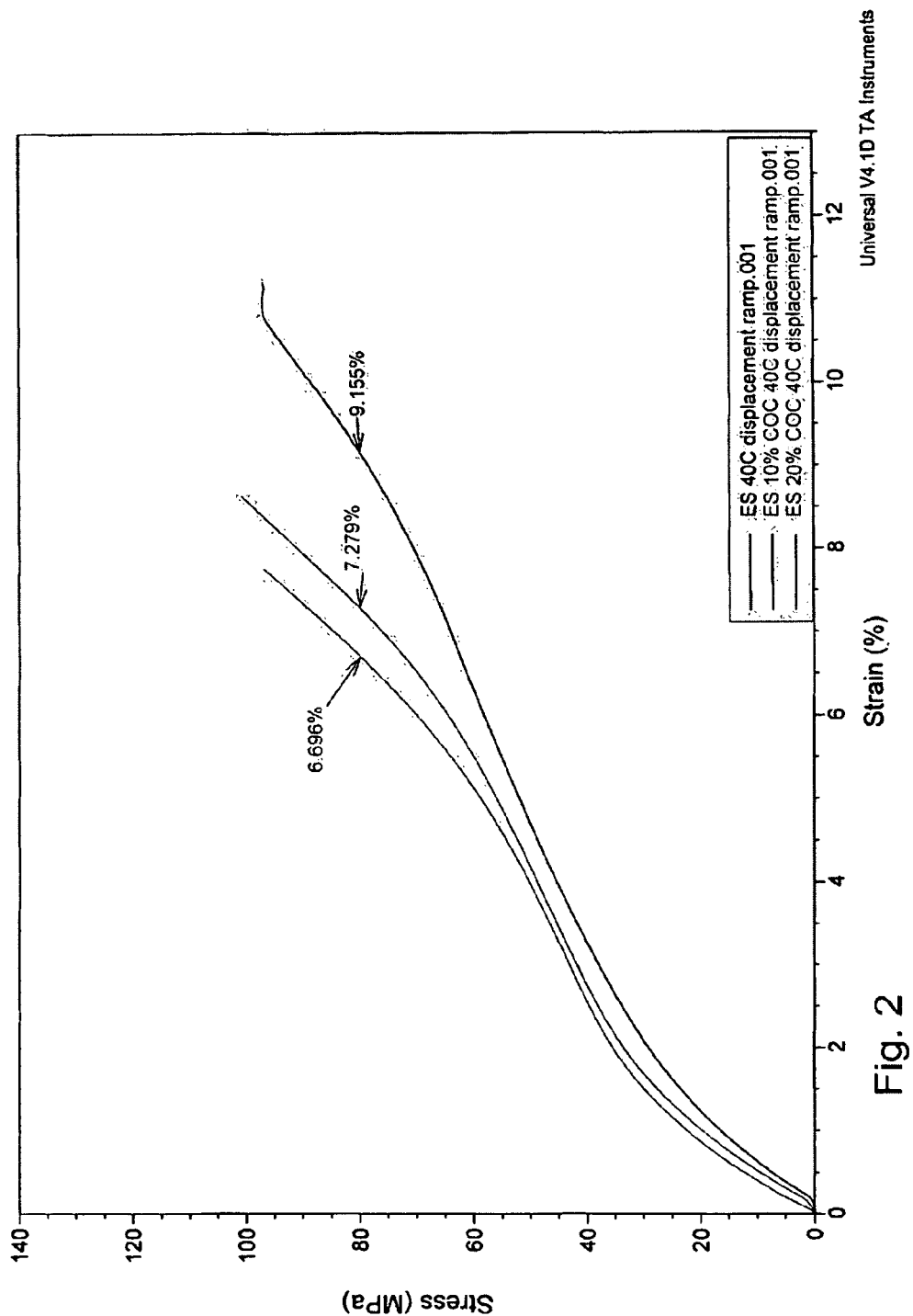
FIG. 2 illustrates DMA analysis at 40 degrees C. Stress vs Strain for standard HDPE and improved HDPE of the present invention.
Figure 3:
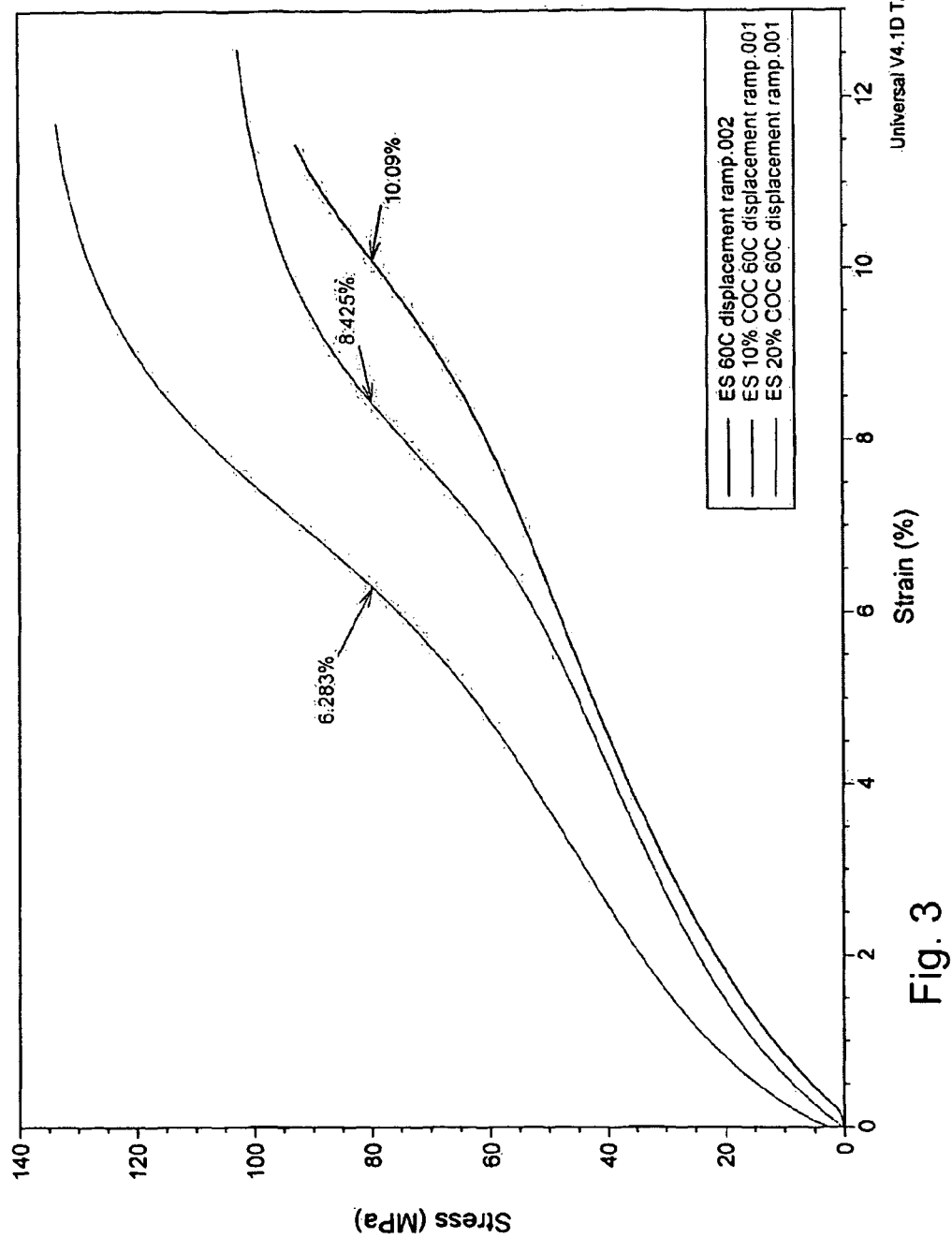
FIG. 3 illustrates DMA analysis at 60 degrees C. Stress vs Strain for standard HDPE and improved HDPE of the present invention.
Figure 4:
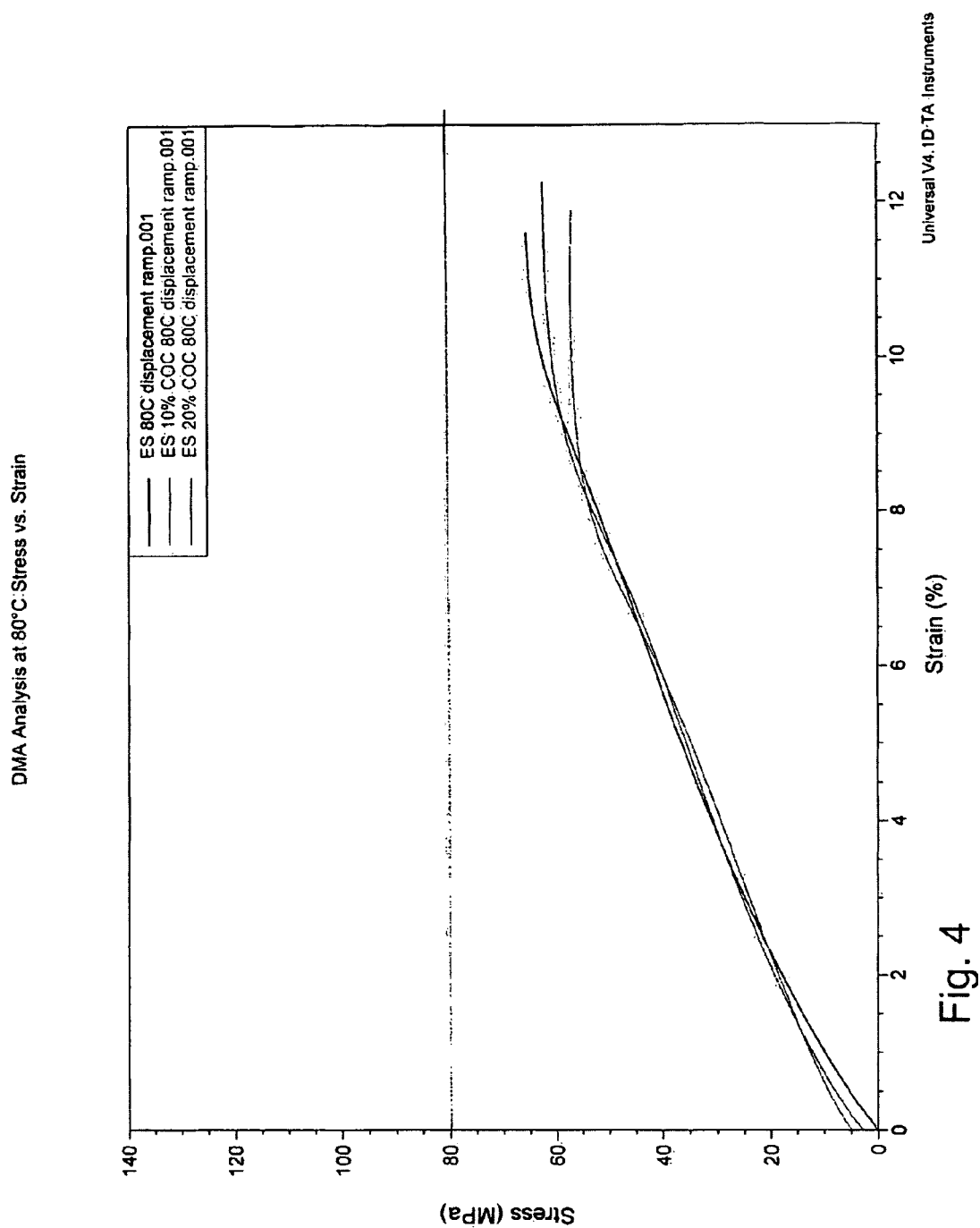
FIG. 4 illustrates DMA analysis at 80 degrees C. Stress vs Strain for standard HDPE and improved HDPE of the present invention.

Various types of cyclic-olefin copolymers (COCs) are known in the art. In general early COCs, manufactured with Ziegler-Natta catalysts have high glass transition temperature and yield films having inferior haze values. These limitations have been overcome with recent advances in the manufacture of COCs. Both types are suitable for this application. In one embodiment of the present invention, it is preferred to use COCs with a glass transition temperature below 70° C. and a melt flow rate of approximately 1.0 at 190° C. Single site catalyzed COCs include metallocene catalyzed COCs. For the examples shown in FIGS. 1-5, a COC product from Ticona was used and had the designation Topas 9506 F-04. This product has a glass transition temperature of 68 degrees C.

Referring to FIGS. 1-4, graphs of stress vs. strain curve for an individual HDPE tape of the present invention is illustrated. This testing was done on a Dynamic Mechanical Analyzer (DMA). The test conditions were as follows:

| Preload Force | 0.001 N |
|---|---|
| Initial displacement | 1.0 um |
| Displacement rate | 100 um/min |
| Final displacement | 1200 um |
| Isothermal temperature | |

The improved HDPE fabric tapes of the present invention were all produced by casting a thick film into water, slitting the cast into ribbons, heating the slit ribbons to a temperature below the melting point and then drawing the ribbons in the solid state at a ratio of about 5 to 1. The tapes were then run through a secondary heating process where they were allowed to slightly relax (annealing). The annealing improves the toughness of the tapes and therefore improves the ability of the tapes to be woven without breaking easily. The process of orienting tape is well known in the industry. For this particular tape grade the thickness of the original cast was 4.5 mils, the annealing temperature was 128 C and the final tape width was 125 mils. The tapes of the control example and the invention examples were all produced to a final weight of 1600 denier.

The HDPE used in one embodiment of the present invention has a melt index of 0.65 and a density of 0.956 although this is not meant as a limitation. Such and HDPE is readily available from Petromont or Nova Chemicals. A particular example of useful HDPE is a product from Nova Chemicals marketed as Sclair® HDPE 59A whose characteristics are hereby incorporated by reference in its entirety including:

| Melt index (ASTM D 1238) | 0.72 g/10 min |
|---|---|
| Density (ASTM D 792) | 0.962 g/cm$^2$ |

As can be seen from the graphs (FIG. 1-4) the addition of COC significantly increases the initial modulus of the tape as well as shifting the stress vs. strain curve to a higher level. A higher initial modulus means that fabrics, made from improved HDPE tape of the present invention, will stretch less with pressure, i.e, they will be stiffer. The shifting of the curves indicates that the tube, made with improved HDPE tape of the present invention, will not stretch as much with temperature while subjected to the internal pressure of the water, when used in an irrigation applications. Table 1 in FIG. 5, illustrates the strain levels of the different tapes measured on the curves shown in FIGS. 1-4 at a stress level of 80 MPa. This is approximately ½ the failure stress of a tape at room temperature. For example, the tape will fail at about a stress level of 80 MPa and that we have tabulated the percentage of stretch at ½ that stress level or 40 MPa. This is a stress level close to the ultimate internal pressure that these tubes using tapes of the present invention will be subjected to in various irrigation applications.

At 40 MPa, a standard HDPE tape stretches 7.9% at 30 C but stretches as much as 10% as the temperature-is increased to 60 C and cannot reach a stress level of 80 MPa at 80 C. The tape containing 20% COC has a lower degree of strain at 30 C, 6.1%, and this strain remains relatively unchanged up to 60 C.

The use of polymers that have higher Tg, (glass transition temperature) together with the HDPE will improve the physical properties (stretch and stress) of a product made with woven fabric of such material. The compatibility of such higher Tg material is also important. For example, standard polypropylene products have a higher Tg property, but such products are not compatible with HDPE.

In another preferred embodiment of the present invention a scrim is constructed and comprises the improved HDPE/COC of the present invention. Such a scrim may be coated with a low-density polypropylene (LDPE) which further incorporates color, UV resistance additives and anti-static coating depending upon the need. Any such coating would normally be in the range of 4 to 6 mils (0.004 to 0.006 inches) although this is not meant as a limitation. The coating thickness will depend upon the application, and is a design choice to be made based on the application.

The present invention will have benefit in applications where a consistent amount of stretch under a fixed load with varying temperatures is important. A specific example is tensioned fabric buildings and irrigation applications, although these applications are not meant as limitations. Further, the constituent components described herein are not meant as a limitation. For example, UV additive, color additives, anti-static additives are all common additive know to those skilled in the art and will find utility in the polyethylene fabric of the present invention.

A polyethylene fabric with improved physical properties, and method for the making thereof, have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A polyethylene fabric having improved stretch and strain properties, comprising:
    a reinforcing layer comprising a woven scrim made from a mixture of high density polyethylene and cyclic-olefin copolymers,
    wherein the reinforcing layer is produced from a film slit into tapes wherein the tapes have a denier of 1600;
    wherein the cyclic-olefin copolymer is formed by a process comprising polymerizing 2 norbornene with ethylene in the presence of a single site catalyst,
    wherein the cyclic-olefin copolymer has a glass transition temperature (Tg) ranging from about 60° C. to about 70° C.,
    wherein the cyclic olefin copolymer has melt flow rate of about 1.0 at 190° C.; and
    wherein the high density polyethylene has a melt index ranging from about 0.65 g/10 min to about 0.75 g/10 min.

2. The fabric according to claim 1, wherein the reinforcing layer comprises from about 60% to about 99% by weight of the layer HDPE and from about 1% to about 40% by weight of the layer cyclic-olefin copolymers.

3. The fabric of claim 1 further comprising a coating layer disposed on at least one surface of the reinforcing layer.

4. The fabric according to claim 3, wherein the coating layer comprises polyethylene.

5. The fabric according to claim 4, wherein the polyethylene is selected from the group consisting of ethylene methacrylate (EMA), low density polyethylene (LDPE), and linear low density polyethylene (LLDPE).

6. The fabric of claim 3, wherein the coating is disposed on both surfaces of the reinforcing layer.

7. The fabric of claim 4, wherein the coating further comprises UV resistance additives.

8. The fabric of claim 4, wherein the coating further comprises color.

9. The fabric of claim 4, wherein the coating further comprises anti-static coating.

10. The fabric of claim 1, wherein the cyclic-olefin copolymer is selected from a group consisting of polynorbornene, polydimethyloctahydro-naphthalene, polycyclopentene, and poly(5 methyl)-norbornene.

11. The fabric of claim 1, wherein the cyclic-olefin copolymer is a non-polar fully amorphous cyclic olefin copolymer.

12. The fabric of claim 1, wherein the single site catalyst is a metallocene catalyst.

13. The fabric of claim 1, wherein the high density polyethylene has a melt index of 0.65 g/10 min.

14. The fabric of claim 1, wherein the high density polyethylene has a melt index of 0.72 g/10 min.

15. The fabric of claim 1, wherein the high density polyethylene has a density ranging from about 0.955 g/cm$^2$ to about 0.962 g/cm$^2$.

16. The fabric of claim 1, wherein the high density polyethylene has a density of about 0.956 g/cm$^2$.

17. The fabric of claim 1, wherein the high density polyethylene has a density of about 0.962 g/cm$^2$.

18. A tensioned building fabric comprising the reinforcing layer of claim 1, wherein the reinforcing layer is prepared by a process comprising the steps of:
    mixing HDPE pellets and COC pellets to form a mixture;
    extruding the mixture to form a sheet film;
    slitting the film into tapes; and
    forming a woven scrim from the tapes; whereby the woven scrim forms the reinforcing layer for the fabric.

19. An irrigation hose comprising the reinforcing layer of claim 1, wherein the reinforcing layer is prepared by:
    mixing HDPE pellets and COC pellets to form a mixture;
    extruding the mixture to form a sheet film;
    slitting the film into tapes; and
    forming a woven scrim from the tapes; whereby the woven scrim forms the reinforcing layer for the irrigation hose.

* * * * *